United States Patent [19]

Olcott

[11] 4,075,187
[45] Feb. 21, 1978

[54] METHOD FOR MAKING BLOW MOLDED GENERALLY TIRE SHAPED ARTICLES

[75] Inventor: Tyler Keith Olcott, Valentines, Va.

[73] Assignee: W. R. Grace & Co., Duncan, S.C.

[21] Appl. No.: 685,567

[22] Filed: May 12, 1976

[51] Int. Cl.² ............................................. B29C 17/07
[52] U.S. Cl. ........................................ 264/89; 264/98; 264/326; 425/530
[58] Field of Search ............... 264/89, 94, 96–99, 264/294–296, 315, 326; 425/326 B, 387 B, 31, 32, DIG. 205, DIG. 214, 530–532; 152/330 R

[56] References Cited

U.S. PATENT DOCUMENTS

| 2,814,072 | 11/1957 | Soderquist | 425/387 B |
| 3,347,964 | 10/1967 | Sidles | 264/94 |
| 3,470,933 | 10/1969 | Molnar | 152/330 R |
| 3,507,942 | 4/1970 | Lynch | 264/94 X |
| 3,736,201 | 5/1973 | Teraoka | 264/294 X |
| 3,917,791 | 11/1975 | Kratochvil et al. | 264/326 |

FOREIGN PATENT DOCUMENTS 1,100,134  1/1968  United Kingdom ............... 264/96

Primary Examiner—Jan H. Silbaugh
Attorney, Agent, or Firm—John J. Toney; William D. Lee, Jr.; John B. Hardaway

[57] ABSTRACT

A tire shaped article is blow molded by extruding a tubular parison between movable mold sections, sealing the open end of the parison, injecting air into the parison, moving a lower mold section and the bottom portion of the parison upwardly and expanding an intermediate portion of the parison radially outwardly into a mold cavity.

6 Claims, 5 Drawing Figures

METHOD FOR MAKING BLOW MOLDED GENERALLY TIRE SHAPED ARTICLES

This invention relates generally to the blow molding of thermoplastic material and more specifically to a new and useful method for blow molding generally tire shaped thermoplastic articles or the like.

Lightweight wheels and tires are routinely blow molded for toys etc. but generally it is difficult to produce or mold a heavy accurate part. The normal extrusion blow molding process comprises moving the mold sections along an axis perpendicular to the direction of a free hanging tubular parison. This is not well suited to generally tire shaped articles: (1) Utilization of material is poor since a round part is being formed from a piece of material that has a rectangular projected area in the plane of the mold. (2) The material distribution is or tends to be unequal from one side of the tire to the other because of sag in the parison depending from the extruder die. (3) Programming of the parison can be used to improve uniformity of the material distribution by compensating for sag but cannot be used effectively to control the thickness of the cross section of the tire. For example, it would be desirable to vary the thickness of the side walls versus the bead area and tread area. This cannot be done with a normal blow molding process. (4) Many applications for tires require a flexible plasticized material. However, such material is difficult to handle with the normal blow molding process because of parison sag. (5) Tire shaped objects blow molded by conventional processes have a weld line around the circumference. This is undesirable since it is in an area of major flexing and is susceptible to failure.

It is possible by the method of this invention to blow mold an object such as a tire so as to make efficient use of the extruded plastic, to accurately distribute material around the tire, to vary the wall thickness through the wall cross section and to use a plasticized material with relatively low melt strength.

A primary object of our invention is to provide a method of blow molding plastic articles of generally tire shape.

Another object of our invention is to provide method of blow molding thermoplastic articles having a cross sectional wall of varying thickness.

In one aspect of the invention an article is made from a molten tubular parison sealed at both ends (either by welding it together or by a part of the machine sealing it) and containing entrapped air comprising moving one end of the parison toward the other end, restraining the radial outward movement of a portion of the parison while permitting the remaining portion to move radially outwardly into a confined zone.

In another aspect of the invention the molten tubular parison is extruded between two mold sections which are adapted to move toward each other and in a direction parallel to the axis of the tubular parison.

In another aspect of the invention the lower portion of the sealed tubular parison is moved in a direction parallel to the axis of the parison and in a direction toward the die of the extruder thereby permitting an intermediate portion of the parison wall to expand radially outwardly into a cavity in the mold sections which surrounds the tubular parison in an intermediate portion. In another embodiment of the invention the radial expansion of the parison into the cavity is controlled by varying the amount of air in the parison or otherwise controlling or varying the air pressure. Bleeding of excess air may be necessary.

In another embodiment of the invention the radial expansion of the parison is controlled by the length of movement and/or the rate of movement of said movable mold section.

In yet another embodiment of the invention the open lower end of the parison is sealed with a vertically movable plug or expanding plug and the lower portion is moved upwardly simultaneously with the movement upwardly of the vertically reciprocal lower mold section. A pair of horizontally reciprocal sliding plates can also be used to "surround" the plug.

In yet another embodiment of the invention pinch off means or a land area may be incorporated in the mold sections at the inside diameters of the tire to form a closed toroidal shaped object. The object could then be preinflated (which could involve use of a blow needle to penetrate the part).

In another embodiment the lower end of the parison is moved vertically upward inside the upper portion, using entrapped air to prevent touching and welding of adjacent surfaces of the hot plastic.

In one aspect of the invention means are provided for extruding the molten tubular parison between reciprocable mold sections adapted to engage each other and having cavities in each which cooperate to form a contour of the outside of the article to be molded, means for sealing the open end of the tubular parison, means for sealing the upper end of the tubular parison, means for moving one of said mold sections toward and into engagement with the other mold section to totally enclose said parison and means for injecting fluid into said parison to expand the parison into the mold cavity to form the article.

The foregoing and other objects, advantages and characterizing features of the apparatus of our invention will become clearly apparent from the ensuing detailed description thereof, considered in conjunction with the accompanying drawings wherein like reference numerals denote like parts throughout the various views.

Figure 1:
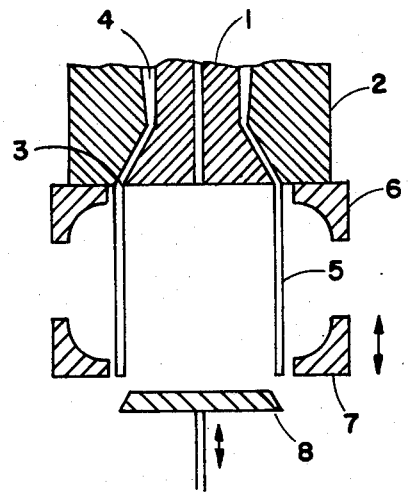
FIG. 1 is a vertical cross sectional view of a diagramatic illustration of the essential features comprising the die, the molten parison, the movable dies and the plug.
Figure 2:
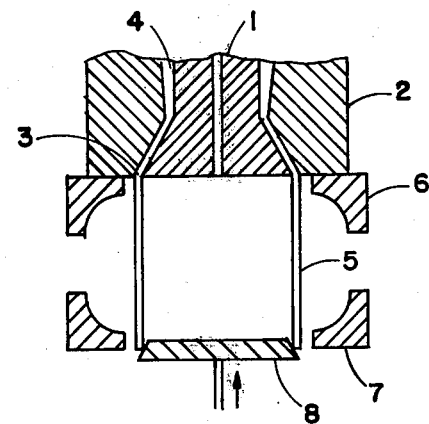
FIG. 2 is also a cross sectional view identical to FIG. 1 except showing the plug in a closed position.

Referring now to the accompanying drawings there is shown only the essential features of the apparatus for our invention since the blow molding of thermoplastic materials is a well known art. Referring now to FIG. 1 there is shown the mandrel 1 and the die ring 2 which form a die 3 which is an annular opening through which the molten thermoplastic 4 is extruded. Not shown but well known in the art is the extruder with the screw for forcing the molten material toward the die opening 3. The molten material is extruded downwardly as shown although as previously indicated this could be done horizontally. The material depending from the opening 3 is the molten parison 5. The upper mold section 6 which may comprise one or more divided parts is affixed to or abutted adjacent to the die ring or upper press platen 2. The lower mold section 7 which may also be subdivided into two or more sections is vertically reciprocal in a direction parallel to the axis of the parison 5. It or parts of it may also be movable inwardly and outwardly if desired to pinch off the parison against the plug 8. The plug 8 is movable vertically and reciprocable so as to close off the lower end portion of the parison 5 as illustrated in FIG. 2. Any suitable means may be provided for the movement of the plug 8 and the movable mold section 7.

Figure 3:
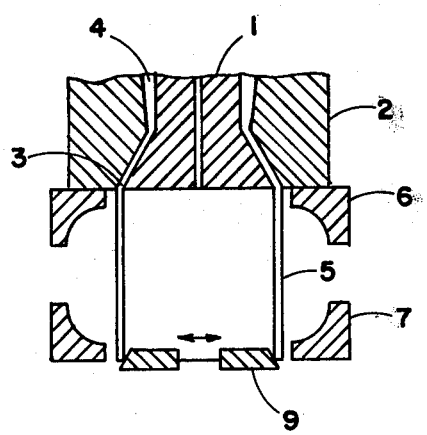
FIG. 3 is identical to FIG. 1 except showing the utilization of an expandable plug.

In FIG. 3 is illustrated the same apparatus as shown in FIG. 1 but instead of using a vertically movable plug an expandable plug 9 is utilized which is reciprocable horizontally (radially) so as to pinch off or close the parison 5.

Figure 4:
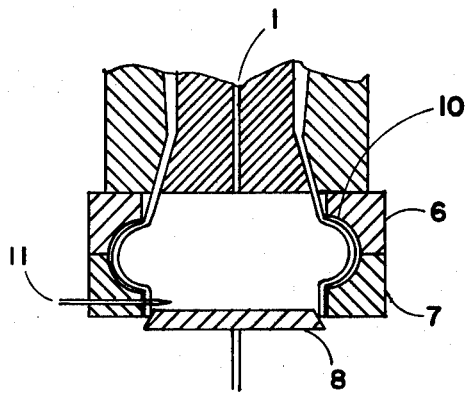
FIG. 4 is a cross sectional view of the molds in a closed position in cooperation with the parison plug and extrusion die.
Figure 5:
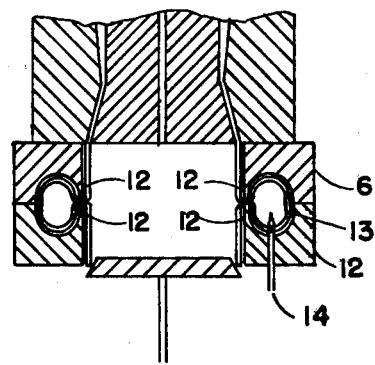
FIG. 5 is a cross sectional vertical view of essentially the same apparatus shown in FIG. 1 except that land areas have been added to permit the total enclosure of a toroidal shaped object.

In FIG. 4 is illustrated the conclusion of the process described herein. As shown the movable mold section 7 has moved upwardly into an abutting relationship with the upper mold section 6. With the plug 8 in the lower portion of the parison the air, which has been injected through the blow pipe 1 and has been entrapped within the enclosed or sealed off parison due to the upward movement of the plug and the lower mold section 7, causes the intermediate portion of the parison wall to roll out or expand radially outwardly to fit the contours of the mold section 10 because of air trapped inside.

If desired a foam material such as foam polyurethane could be injected into the interior of the enclosed circular object 13 through any suitable device such as another blow needle 14 or the like.

The articles usefully made from our invention can be made with any suitable thermoplastic material capable of being blow molded such as polyethylene, polypropylene, elastomeric polyolefins etc. While we have disclosed and described in detail a limited number of embodiments of our invention with certain modifications it will be appreciated that this has been done by way of illustration only without thought of limitation.

It will be readily seen that the lower open end portion of the molten tubular parison may be sealed by any suitable means known to those skilled in the art. For example, a vertically reciprocal plug may be inserted into the lower end portion. The plug may also be expandable radially. In addition not only could the lower mold section move vertically it could also move horizontally to first seal off the lower end portion of the parison prior to its vertical movement.

While this invention has been described primarily with reference to a downwardly depending molten tubular parison it can be readily seen that the invention is equally suitable where a molten tubular parison is extruded horizontally. The mold section would then move in a generally parallel direction to the axis of the parison but the direction would be horizontal.

While we are showing the cavity surrounding the tubular parison to be a simple trough shaped cavity it will be obvious that the shape can be of any type desirable. In addition several cavities in a direction parallel to the axis of the parison could be provided. One or more articles could be made from the same parison. In general it will be understood that the means for extruding the molten tubular parison will be well known to those skilled in the art such as an extruder with a screw which will force the molten thermoplastic material through an annular die. The extrusion die may be fed by an intermittent discontinuous operation or formation of the parison.

The parison will be filled with a controlled amount of fluid, normally air but it could be any other compressible fluid, immediately upon closing of the lower end. In fact, if the lower end is closed and the upper end is sealed there will be a certain amount of air entrapped anyway. The amount of air entrapped within the sealed parison will be a determining factor in the radial expansion outwardly of the parison into the mold cavity upon the movement of the lower mold section upwardly and into engagement with the upper mold section. After the mold sections have become engaged and the thermoplastic material has entered into the mold cavity it may be necessary in some instances to inject an increased amount of air or other fluid into the parison so as to further blow the parison walls into intimate contact with the contours of the walls of the molds. Any suitable number of mold sections may be employed.

Since the lower portion of the tubular parison may be supported by a vertically movable plug it may be possible to use a pliable material with low hot melt strength. In the absence of such a plug and with the use of materials with low hot melt strength it would be expected that the parison would sag thereby causing uneven distribution of material in the final article. This invention overcomes this problem.

In addition to controlling the amount of air within the parison and thus the pressure of the air, it is possible to control the movement of the parison wall into the mold cavity by adjusting or otherwise controlling the distance or rate of vertical movement of the lower mold portion of the tubular parison. In other words, if the tubular parison moves a great distance it will be possible to move a larger volume of tubular parison into the cavity. Depending on the shape or size of the cavity it may facilitate movement of the wall into the cavity to control the rate also.

Depending on the configuration of the part being formed high presure air can be introduced either through the plug or through the die after the mold is closed or through a needle incorporated in the mold.

After a part is cooled and decompressed the mold is opened either by releasing the plug and allowing the part to remain in the top half or using the plug to keep the part in the bottom half so that it is pulled loose from the die, releasing the plug so that it can be removed. Usually the free end of the parison can be torn off.

Although the parison is stretched radially outwardly, the technique of "rolling" it outwardly into the cavity while the mold is closing permits very good control of the material thickness in the finished part. The art already includes various techniques of programming the thickness of the parison by opening and closing the die mandrel nearer the ring, thus making thick and thin "bands" in the parison. This does not help in the normal process, but since our press is vertical and the bands horizontal our process can make any circumference of the tire thick or thin, or at least compensate for the thinning that would take place because of the stretching of the material outward.

What is claimed is:

1. A method for blow molding a tire shaped article, comprising:
   extruding a molten tubular thermoplastic parison downwardly from a die through a space intermediate two mold sections comprising an upper mold section and a lower mold section engageable with each other;

sealing a bottom opened end of the tubular parison to entrap a compressible fluid in said parison, said parison being sealed at its upper end by said die;

moving the lower mold section vertically into engaging relationship with the upper mold section, said mold sections when engaged forming a radially extended tire shaped cavity adjacent and surrounding an intermediate portion of the parison;

moving a lower portion of the tubular parison upwardly relative to said upper end and permitting a central portion of the tubular parison to expand outwardly radially into said tire shaped cavity;

injecting fluid into said parison under sufficient pressure to conform the outwardly expanded parison portion to the molds defining the tire shaped cavity;

opening the molds; and unsealing both the bottom and top portions of said parison to provide the tire shaped article.

2. The method of claim 1 wherein said parison is sealed with a vertically reciprocal plug.

3. The method of claim 1 wherein said parison is sealed with an expanding plug.

4. The method of claim 1 wherein radial expansion of the parison is controlled by varying the amount of air within the parison.

5. The method of claim 1 wherein the radial expansion of the parison is controlled by the length of movement vertically of said lower mold section.

6. The method of claim 1 wherein said lower parison portion is moved upwardly simultaneously with the movement of the lower mold section.

* * * * *